United States Patent
Steinmann

[11] Patent Number: 6,165,408
[45] Date of Patent: Dec. 26, 2000

[54] MOULDED OPHTHALMIC ARTICLE

[75] Inventor: Bettina Steinmann, Praroman-Le Mouret, Switzerland

[73] Assignee: Novartis AG, Basel, Switzerland

[21] Appl. No.: 09/355,769

[22] PCT Filed: Feb. 2, 1998

[86] PCT No.: PCT/EP98/00547

§ 371 Date: Aug. 4, 1999

§ 102(e) Date: Aug. 4, 1999

[87] PCT Pub. No.: WO98/33834

PCT Pub. Date: Aug. 6, 1998

[30] Foreign Application Priority Data

Feb. 4, 1997 [DE] Germany ............ 978 10 056

[51] Int. Cl.[7] .......... C08G 18/48; C08G 14/81; C08F 2/50; C08F 299/06; G02B 1/04

[52] U.S. Cl. .......... 264/496; 351/159; 351/160 R; 523/106; 522/84; 522/85; 522/86; 522/96; 522/97; 526/312; 528/60; 528/65

[58] Field of Search .................. 522/86, 85, 84, 522/173, 96, 97; 523/106; 351/160 R, 159; 526/312; 264/496; 528/60, 65

[56] References Cited

U.S. PATENT DOCUMENTS 5,039,458  8/1991  Braatz et al. .................. 264/2.6
5,496,496  3/1996  Kajita et al. .

FOREIGN PATENT DOCUMENTS 0 379 462 A2  1/1990  European Pat. Off. .
0 537 877 A2  6/1992  European Pat. Off. .
0 579 503 A2  7/1993  European Pat. Off. .

Primary Examiner—Susan W. Berman
Attorney, Agent, or Firm—R. Scott Meece; Robert J. Gorman, Jr.

[57] ABSTRACT

The invention relates to moulded ophthalmic articles, especially contact lenses, which are obtainable by cross-linking a prepolymer which is the copolymerization product of (a) at least one polyalkylene glycol of the formula (1): HO—$(CH_2-CH_2-O)_n-(CHY_1-CHY_2-O)_m-(CHY_3-CHY_4-O)_p$—H or (1'): HO—$[(CH_2-CH_2-CH_2-CH_2-O)]_q$—H, (b) at least one polyhydroxy compound selected from the group consisting of (I) a linear or branched aliphatic polyhydroxy compound of the formula (2): $R_1-(OH-)_x$ or a polyether polyol or polyester polyol derived therefrom, and (ii) a cycloaliphatic polyol selected from the group polyhydroxy-$C_5$–$C_8$-cycloalkane and unsubstituted mono- or disaccharide, (c) at least one di- or polyisocyanate of the formula (3): $R_2-(NCO)_y$, (d) at least one ethylenically unsaturated monoisocyanate of formula (4), or an ethylenically unsaturated acid halide of formula (4'), and optionally further copolymerizable monomers, wherein the variables have the significances given in the claims, in the absence or presence of an additional vinylic comonomer.

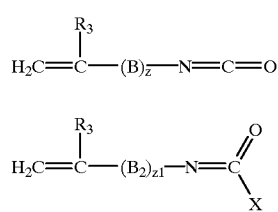

17 Claims, No Drawings

MOULDED OPHTHALMIC ARTICLE

The present invention relates to specific branched polyurethane (meth)acrylates, processes for the production thereof, and moulded ophthalmic articles containing them, especially contact lenses.

Polymerisable urethane resins containing inorganic fillers, which are the reaction product of an ethylenically unsaturated polyisocyanate component with an ethylenically unsaturated polyol, and the thermal crosslinking of them into moulded articles, are already known e.g. from JP-A-3-210317. In addition, polymerisable resins which are the addition product of an unsaturated isocyanate with an amino-group-containing urethane are known e.g. from JP-A-7-292046. EP-A-0537877 discloses macromers which are obtainable e.g. by reacting a compound, which may be obtained from an ethylenically unsaturated isocyanate, a polyalkylene glycol and a diisocyanate, and which still has a free isocyanate group at its disposal, with a sugar derivative whose hydroxy groups are at least partly alkoxylated with an alkylene oxide, and also ophthalmic lenses that are obtainable from these macromers by crosslinking.

Now, surprisingly, new branched polyurethane (meth)acrylates have been found, which can be crosslinked in a particularly simple manner, e.g. directly from aqueous solution or solvent-free, to form moulded ophthalmic articles, such as contact lenses.

The present invention relates to ophthalmic mouldings, which are obtainable by crosslinking a prepolymer which is the copolymerisation product of (a) at least one polyalkylene glycol of formula

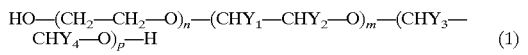

or

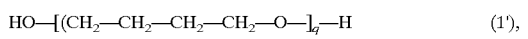

wherein one of radicals $Y_1$ and $Y_2$ signifies methyl and the other signifies hydrogen, one of radicals $Y_3$ and $Y_4$ is ethyl and the other is hydrogen, q is a number from 1 to 50, and n, m and p, independently of one another, are each a number from 0 to 100, wherein the sum of (n+m+p) is 5 to 100, (b) at least one polyhydroxy compound selected from the group consisting of
  (i) a linear or branched aliphatic polyhydroxy compound of formula $$R_1-(OH)_x \quad (2),$$

wherein $R_1$ is the radical of a multi-functional linear or branched aliphatic alcohol and x is a number $\geq 3$,
  (ii) a polyether polyol, which is the polymerisation product of a compound of formula (2) and a glycol,
  (iii) a polyester polyol, which is the polymerisation product of a compound of formula (2), a dicarboxylic acid or a derivative thereof and a diol, and
  (iv) a cycloaliphatic polyol selected from the group consisting of a $C_5$–$C_8$-cycloalkane, which is substituted by $\geq 3$ hydroxy groups, and an unsubstituted mono- and disaccharide, (c) at least one di- or polyisocyanate of formula

wherein $R_2$ is the radical of an aliphatic, cycloaliphatic, aliphatic-cycloaliphatic, aromatic or araliphatic di- or polyisocyanate and y is a number from 2 to 6, (d) at least one ethylenically unsaturated monoisocyanate of formula

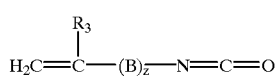

or an ethylenically unsaturated acid halide of formula

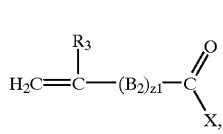

wherein $R_3$ is hydrogen or methyl, z and z1 independently of one another signify the number 0 or 1, B signifies $C_1$–$C_6$-alkylene, or phenylene or $C_7$–$C_{12}$-araikylene which is each unsubstituted or substituted by $C_1$–$C_4$-alkyl or $C_1$–$C_4$-alkoxy, or a radical of formula

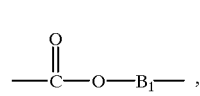

$B_1$ signifies linear or branched $C_2$–$C_{12}$-alkylene which is optionally interrupted by one or more oxygen atoms,
$B_2$ is $C_1$–$C_6$-alkylene and X signifies halogen,
and optionally one or more further copolymerisable monomers, in the absence or presence of an additional vinylic comonomer.

In formula (1), n, m and p, independently of one another, preferably each denote a number from 0 to 50, whereby the sum of (n+m+p) is 8 to 50. Most preferably, n, m and p, independently of one another, each denote a number from 0 to 25, whereby the sum of (n+m+p) is 9 to 25. In formula (1'), q preferably signifies a number from 1 to 20.

The polyalkylene glycol according to (a) is e.g. a polyethylene glycol, polypropylene glycol, polyethylene glycol/polypropylene glycol block polymer, polyethylene glycol/polypropylene glycol/polybutylene glycol block polymer or a polytetrahydrofuran.

Preferred embodiments of the polyalkylene glycol according to (a) are represented by:
  (I) compounds of formula (1), wherein p is 0, n and m, independently of one another, are each a number from 0 to 100, preferably 0 to 50, and most preferably 0 to 25, and the sum of (n+m) is 5 to 100, preferably 8 to 50, most preferably 9 to 25.
  (ii) compounds of formula (1), wherein p and m are each 0 and n signifies a number from 5 to 100, preferably 8 to 50, most preferably 9 to 25.

$R_1$ in formula (2) signifies e.g. the radical of an aliphatic polyol with 2 to 18, preferably 3 to 12, most preferably 3 to 8 carbon atoms. The variable x preferably signifies a number from 3 to 12, preferably a number from 3 to 8, most preferably a number from 3 to 6, and particularly preferably the number 3.

Examples of suitable polyhydroxy compounds of formula (2) are glycerol, diglycerol, triglycerol, 1,1,1-trishydroxymethylethane, 1,1,1-trishydroxymethylpropane, 1,2,4-butanetriol, 1,2,6-hexanetriol, erythritol, pentaerythritol, di- or tripentaerythritol, arabitol, sorbitol, disorbitol or mannitol and mixtures thereof. Preferred compounds of formula (2) are glycerol, 1,1,1-trishydroxymethylpropane, 1,2,4-butanetriol, erythritol, pentaerythritol, arabitol or sorbitol. A group of especially preferred compounds of formula (2) comprises glycerol, 1,1,1-trihydroxymethyl-propane and pentaerythritol.

Further suitable as a polyhydroxy compound according to (b) are reaction products of the above-mentioned polyhydroxy compounds of formula (2) with a dicarboxylic acid or with a derivative of a dicarboxylic acid, e.g. a dicarboxylic acid anhydride, ester or halide, as well as a diol, whereby oligomeric polyester polyols are obtained, or reaction products of the above-mentioned polyhydroxy compounds with a glycol, whereby oligomeric polyether polyols are obtained.

If the polyhydroxy compound according to (b) in question is a polyester polyol, then this is preferably an oligomeric reaction product of a compound of formula (2), wherein the above-mentioned meanings and preferences apply, with an aliphatic or cycloaliphatic dicarboxylic acid having 3 to 12 carbon atoms, or an aromatic dicarboxylic acid having 5 to 15 carbon atoms, or an appropriate derivative thereof, e.g. a corresponding dicarboxylic acid anhydride, ester or halide, as well as a diol as chain extender. Examples of suitable dicarboxylic acids are malonic acid, succinic acid, 2,2-dimethylsuccinic acid, glutaric acid, adipic acid, pimelic acid, sebacic acid, tetrahydrophthalic acid, hexahydrophthalic acid, phthalic acid, isophthalic acid, terephthalic acid, maleic acid or fumaric acid, as well as the corresponding dicarboxylic acid esters, halides or anhydrides. Appropriate diols are e.g. linear or branched $C_2$–$C_{20}$-alkyl-diols; compounds of the above-mentioned formula (1), wherein $Y_1$ and $Y_2$ have the above-mentioned meanings, p is 0, m and n, independently of one another, each signify a number from 0 to 10, and the sum of (n+m) is 3 to 10; as well as aromatic-aliphatic diols with 7 to 20 C-atoms.

If the polyhydroxy compound according to (b) in question is a polyether polyol, then this is preferably a short-chained polymerisate consisting of a compound of formula (2), wherein the above-mentioned significances and preferences apply, and ethylene glycol, propylene glycol or a mixture thereof.

The above-described polyester polyols and polyether polyols are available commercially, e.g. as Desmophen® types, e.g. as Desmophen® 650, 670, 550U, 250U.

If the polyhydroxy compound according to (b) in question is a cycloaliphatic polyol, then this may be e.g. cyclopentane or preferably a cyclohexane, which is respectively substituted by 3 to 5 and preferably by 3 or 4 hydroxy groups and bears no further substituents or hetero atoms. Further suitable cycloaliphatic polyols according to (b) are represented by unsubstituted mono- or disaccharides, e.g. glucose, fructose, mannose, galactose, maltose, lactose or saccharose.

In formula (3), $R_2$ signifies e.g. the radical of a linear or branched aliphatic polyisocyanate with 3 to 24 C-atoms, the radical of a cycloaliphatic or aliphatic-cycloaliphatic polyisocyanate with 3 to 24 C-atoms, or the radical of an aromatic or araliphatic polyisocyanate with 6 to 24 C-atoms. The variable y preferably signifies a number from 2 to 4, most preferably the number 2.

The polyisocyanate according to (c) in question is preferably a diisocyanate of formula $$OCN-R_2-NCO, \qquad (3a)$$

wherein $R_2$ signifies linear or branched $C_3$–$C_{18}$-alkylene, or unsubstituted or $C_1$–$C_4$-alkyl-substitut or $C_1$–$C_4$-alkoxy-substituted $C_6$–$C_{10}$-arylene, $C_7$–$C_{18}$-aralkylene, $C_6$–$C_{10}$-arylene-$C_1$–$C_2$-alkylene-$C_6$–$C_{10}$-arylene, $C_3$–$C_8$-cycloalkylene, $C_3$–$C_8$-cycloalkylene-$C_1$–$C_6$-alkylene, $C_3$–$C_8$-cycloalkylene-$C_1$–$C_2$-alkylene-$C_3$–$C_8$-cycloalkylene or $C_1$–$C_6$-alkylene-$C_3$–$C_8$-cycloalkylene-$C_1$–$C_6$-alkylene.

$R_2$ as alkylene preferably signifies a linear or branched $C_3$–$C_{18}$-alkylene radical, more preferably a linear or branched $C_4$–$C_{12}$-alkylene radical, and most preferably a linear or branched $C_6$–$C_{10}$-alkylene radical. A few preferred alkylene radicals are 1,4-butyiene, 2,2-dimethyl-1,4-butylene, 1,5-pentylene, 2,2-dimethyl-1,5-pentylene, 1,6-hexylene, 2,2,3- or 2,2,4-trimethyl-1,5-pentylene, 2,2-dimethyl-1,6-hexylene, 2,2,3- or 2,2,4- or 2,2,5-trimethyl-1,6-hexylene, 2,2-dimethyl-1,7-heptylene, 2,2,3- or 2,2,4- or 2,2,5- or 2,2,6-trimethyl-1,7-heptylene, 1,8-octylene, 2,2-dimethyl-1,8-octylene or 2,2,3- or 2,2,4- or 2,2,5- or 2,2,6- or 2,2,7-trimethyl-1,8-octylene.

If $R_2$ is arylene, this is preferably naphthylene and most preferably phenylene. If the arylene is substituted, a substituent is preferably located in ortho position to an isocyanate group. Examples of substituted arylene are 1-methyl-2,4-phenylene, 1,5-dimethyl-2,4-diphenylene, 1-methoxy-2,4-phenylene or 1-methyl-2,7-naphthylene.

$R_2$ as aralkylene is preferably naphthylalkylene and most preferably phenylalkylene. The alkylene group in aralkylene preferably contains 1 to 12, most preferably 1 to 6 and particularly preferably 1 to 4 C-atoms. The alkylene group in aralkylene is most particularly methylene or ethylene. A few examples are 1,3- or 1,4-benzylene, naphth-2-yl-7-methylene, 6-methyl-1,3- or -1,4-benzylene, 6-methoxy-1, 3- or -1,4-benzylene.

If $R_2$ is cycloalkylene, it is preferably $C_5$–$C_6$-cycloalkylene and most preferably cyclohexylene which is respectively unsubstituted or methyl-substituted. A few examples are 1,3-cyclobutylene, 1,3-cyclopentylene, 1,3- or 1,4-cyclohexylene, 1,3- or 1,4-cycloheptylene, 1,3- or 1,4- or 1,5-cyclooctylene, 4-methyl-1,3-cyclopentylene, 4-methyl-1,3-cyclohexylene, 4,4-dimethyl-1,3-cyclohexylene, 3-methyl- or 3,3-dimethyl-1,4-cyclohexyl, 3,5-dimethyl-1,3-cyclohexylene, 2,4-dimethyl-1,4-cyclohexylene.

If $R_2$ signifies cycloalkylene-alkylene, it is preferably cyclopentylene-$C_1$–$C_4$-alkylene, and especially cyclohexylene-$C_1$–$C_4$-alkylene, which is respectively unsubstituted or substituted once or several times by $C_1$–$C_4$-alkyl, especially methyl. The group cycloalkylene-alkylene preferably denotes cyclohexylene-ethylene and most preferably denotes cyclohexylene-methylene, which is respectively unsubstituted in the cyclohexylene radical or substituted by 1 to 3 methyl groups. A few examples are cyclopent-1-yl-3-methylene, 3-methyl-cyclopent-1-yl-3-methylene, 3,4-dimethyl-cyclopent-1-yl-3-methylene, 3,4,4-trimethyl-cyclopent-1-yl-3-methylene, cyclohex-1-yl-3- or -4-methylene, 3- or 4- or 5-methyl-cyclohex-1-yl-3- or -4-methylene, 3,4- or 3,5-dimethyl-cyclohex-1-yl-3- or -4-methylene, 3,4,5- or 3,4,4- or 3,5,5-trimethyl-cyc-lohex-1-yl-3- or -4-methylene.

If $R_2$ signifies alkylene-cycloalkylene-alkylene, it is preferably $C_1$–$C_4$-alkylene-cyclopentylene-$C_1$–$C_4$-alkylene and especially $C_1$–$C_4$-alkylene-cyclohexylene-$C_1$–$C_4$-alkylene, which is respectively unsubstituted or substituted once or several times by $C_1$–$C_4$-alkyl, most preferably methyl. The group alkylene-cycloalkylene-alkylene preferably denotes ethylene-cyclohexylene-ethylene and most preferably methylene-cyclohexylene-methylene, which is respectively unsubstituted in the cyclohexylene radical or substituted by 1 to 3 methyl groups. A few examples are cyclopentane-1, 3-dimethylene, 3-methyl-cyclopentane-1,3-dimethylene 3,4-dimethyl-cyclopentane-1,3-dimethylene, 3,4,4- trimethyl-cyclopentane-1,3-dimethylene, cyclohexane-1,3- or -1,4-dimethylene, 3- or 4- or 5-methyl-cyclohexane-1,3- or -1,4-dimethy-lene, 3,4- or 3,5-dimethyl-cyclohexane-1,3- or -1,4-dimethylene, 3,4,5- or 3,4,4- or 3,5,5-trimethyl-cyclohexane-1,3- or -1,4-dimethylene.

When $R_2$ is $C_3C_8$-cycloalkylene-$C_1$–$C_2$-alkylene-$C_3$–$C_8$-cycloalkylene or $C_6$–$C_{10}$-arylene-$C_1C_2$-alkylene-$C_6$–$C_{10}$-arylene it is preferably $C_5$–$C_6$-cycloalkylene-methylene-$C_5$–$C_6$-cycloalkylene or phenylene-methylene-phenylene, which may respectively be unsubstituted in the cycloalkyl or phenyl ring or substituted by one or more methyl groups.

The radical $R_2$ in formula (3a) has symmetrical or asymmetrical structure.

One preferred group of polyisocyanates according to (c) comprises compounds of formula (3a), wherein $R_2$ signifies linear or branched $C_6$–$C_{10}$-alkylene, cyclohexylene-methylene or cyclohexylene-methylene-cyclohexylene which are either unsubstituted or substituted in the cyclohexyl moiety by 1 to 3 methyl groups, or phenylene or phenylene-methylene-phenylene which are either unsubstituted or substituted in the phenyl moiety by methyl.

Examples of especially preferred polyisocyanates of formula (3) or (3a) according to (c) are isophorone diisocyanate (IPDI), toluylene-2,4-diisocyanate (TDI), methylenebis(cyclohexyl-isocyanate), 1,6-diisocyanato-2,2,4-trimethyl-n-hexane (TMDI), methylenebis(phenyl-isocyanate) or hexamethylene-diisocyanate (HMDI).

In formulae (4) and (4'), $R_3$, independently of one another, each signify hydrogen or preferably methyl.

The variable z is e.g. the number 0 or preferably the number 1. The variable z1 signifies e.g. the number 1 and preferably the number 0.

When B and $B_2$ are alkylene, they are each, independently of one another, e.g. 1-methyl- or 1,1-dimethyl-methylene, 1,2-ethylene, 1,2- or 1,3-propylene, 2-methyl-propylene or 1,2-, 1,3-, 1,4- or 2,3-butylene, 2,2-dimethyl-1,3-propylene, 2-methyl- or 2,3-dimethyl-1,4-butylene, 1,2-, 1,3-, 1,4- or 1,5-pentylene, 2-methyl- or 3-methyl- or 4-methylpentylene or 1,2-, 1,3-, 1,4-, 1,5- or 1,6-hexylene. B and $B_2$ as alkylene are each, independently of one another, preferably $C_1$–$C_4$-alkylene and most preferably methylene.

When B is a phenylene radical, it is e.g. 1,2-, 1,3- or 1,4-phenylene either unsubstituted or substituted by methyl or methoxy. B as a phenylene radical is preferably 1,3- or 1,4-phenylene.

When B is an aralkylene radical, it is e.g. benzylene which is either unsubstituted or substituted by methyl or methoxy, whereby the methylene group is respectively bonded to nitrogen isocyanate. B as an aralkylene radical is preferably the 1,3- or 1,4-phenylenemethylene radical, whereby the methylene group is respectively bonded to the nitrogen isocyanate.

If B signifies a radical of the above-mentioned formula (5), then $B_1$ as alkylene may be e.g. one of the $C_2$–$C_{12}$-alkylene radicals already mentioned for $R_2$ or B.

Examples of $B_1$ as alkylene which is interrupted by oxygen atoms are —CH$_2$CH$_2$—O—CH$_2$CH$_2$—, —CH$_2$CH$_2$—O—CH$_2$CH$_2$—O—CH$_2$CH$_2$—, —CH$_2$CH$_2$—O—CH$_2$CH$_2$—O—CH$_2$CH$_2$—O—CH$_2$CH$_2$—, —CH(CH$_3$)CH$_2$—O—CH(CH$_3$)CH$_2$—, —CH(CH$_3$)CH$_2$—O—CH$_2$CH$_2$—, —CH(C$_2$H$_5$)CH$_2$—O—CH$_2$CH$_2$—, —CH(C$_2$H$_5$)CH$_2$—O—CH(C$_2$H$_5$)CH$_2$— or —CH$_2$CH$_2$CH$_2$CH$_2$—O—CH$_2$CH$_2$CH$_2$CH$_2$—.

$B_1$ preferably signifies linear or branched $C_2$–$C_8$-alkylene, most preferably linear $C_2$–$C_8$-alkylene, and particularly preferably linear $C_2$–$C_4$-alkylene. In a preferred embodiment of the invention, $B_1$ signifies 1,2-ethylene.

B preferably signifies a radical of the above-mentioned formula (5), wherein for the variable $B_1$ contained therein, the above-mentioned meanings and preferences apply.

X signifies e.g. bromine or preferably chlorine.

Compounds of formula

(4a)

or

(4'a)

wherein $R_3$ is hydrogen or methyl, $B_1$ signifies linear or branched $C_2$–$C_8$-alkylene, $B_2$ is $C_1$–$C_4$-alkylene, z1 signifies the number 0 or 1 and X represents halogen, are preferred as component (d) of the prepolymers according to the invention.

Compounds of the above-mentioned formulae (4'a) or especially (4a), wherein $R_3$ is hydrogen or methyl, $B_1$ is linear or branched $C_2$–$C_4$-alkylene, z1 is the number 0 and X represents bromine or chlorine, are especially preferred as component (d) of the prepolymers according to the invention.

If, in order to produce the prepolymers used according to the invention, further copolymerisable monomers are used as well as components (a)–(d) mentioned above, then these may be in principle all monomers that can form copolymers with di- or poly-isocyanates or di- or polyhydroxy compounds, for example further hydroxy compounds, e.g. ethylenically unsaturated monohydroxy compounds such as 2-hydroxyethyl acrylate or 2-hydroxyethyl methacrylate. However, it is preferable if no further comonomers are used in the production of the prepolymers according to the invention, apart from the said components (a)–(d).

One preferred embodiment of the prepolymers used according to the invention relates to those which are the polymerisation product of (a) one or more polyalkylene glycols of formula

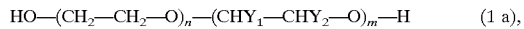

(1 a), wherein one of radicals $Y_1$ and $Y_2$ signifies methyl and the other radical signifies hydrogen,
and n and m, independently of one another, each denote a number from 0 to 50,
wherein the sum of (n+m) is 8 to 50, (b) one or more linear or branched aliphatic polyhydroxy compounds of formula

(2)

wherein $R_1$ is the radical of a multi-functional aliphatic alcohol and x is a number from 3 to 8, (c) one or more diisocyanates of formula

(3a), wherein $R_2$ signifies linear or branched $C_3$–$C_{18}$-alkylene or unsubstituted or $C_1$–$C_4$-alkyl-substituted or $C_1$–$C_4$-alkoxy-substituted $C_6$–$C_{10}$-arylene, $C_7$–$C_{18}$-aralkylene, $C_6$–$C_{10}$-arylene-$C_1$–$C_2$-alkylene-$C_6$–$C_{10}$-arylene, $C_3$–$C_8$-cycloalkylene, $C_3$–$C_8$-cycloalkylene-$C_1$–$C_6$-alkylene, $C_3$–$C_8$-cycloalkylene-$C_1$–$C_2$- alkylene-$C_3$–$C_8$-cycloalkylene or $C_1$–$C_6$-alkylene-$C_3$–$C_8$-cycloalkylene-$C_1$–$C_6$-alkylene, and (d) one or more ethylenically unsaturated compounds of formula

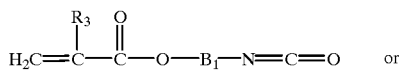
(4a)

or

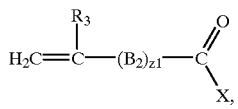
(4'a)

wherein $R_3$ is hydrogen or methyl, $B_1$ signifies linear or branched $C_2$–$C_8$-alkylene, $B_2$ is $C_1$–$C_4$-alkylene, z1 signifies the number 0 or 1 and X represents halogen.

An especially preferred embodiment of the prepolymers used according to the invention relates to those which are the polymerisation product of (a) one or more polyalkylene glycols of formula $$HO-(CH_2-CH_2-O)_n-(CHY_1-CHY_2-O)_m-H \quad (1a),$$

wherein one of radicals $Y_1$ and $Y_2$ signifies methyl and the other radical signifies hydrogen, and n and m, independently of one another, each denote a number from 0 to 25, wherein the sum of (n+m) is 9 to 25, (b) one or more polyhydroxy compounds selected from the group consisting of glycerol, diglycerot, triglycerol, 1,1,1-trishydroxymethylethane, 1,1,1-trishydroxymethylpropane, 1,2,4-butanetriol, 1,2,6-hexanetriol, erythritol, pentaerythritol, di- and tripentaerythritol, arabitol, sorbitol, disorbitol and mannitol and mixtures thereof, (c) a diisocyanate of formula $$OCN-R_2-NCO \quad (3a),$$

wherein $R_2$ signifies linear or branched $C_6$–$C_{10}$-alkylene, cyclohexylene-methylene or cyclohexylene-methylene-cyclohexylene either unsubstituted or substituted in the cyclohexyl moiety by 1 to 3 methyl groups, or phenylene or phenylene-methylene-phenylene either unsubstituted or substituted in the phenyl moiety by methyl, and (d) an ethylenically unsaturated compound of the above-mentioned formula (4a), wherein $R_3$ denotes hydrogen or methyl and $B_1$ signifies linear or branched $C_2$-$C_4$alkylene.

The prepolymers which are the copolymerisation product consisting of the above-mentioned components (a), (b), (c) and (d), whereby the above-mentioned meanings and preferences apply, are new and represent a further object of the invention.

The prepolymers according to the invention may be produced e.g. whereby the above-mentioned components (a), (b), (c) and (d) and optionally further copolymerisable monomers are reacted together in any sequence in an inert solvent at a temperature of e.g. −5° C. to 150° C.

Suitable inert solvents are aprotic, preferably polar solvents, for example hydrocarbon halides (chloroform, methylene chloride, trichloroethane, tetrachloroethane, chlorobenzene), ethers (tetrahydrofuran, dioxane), ketones (acetone, ethyl methyl ketone, dibutyl ketone, methyl isobutyl ketone), carboxylic acid esters and lactones (ethyl acetate, butyrolactone, valerolactone), alkylated carboxylic acid amides (N,N-dimethylacetamide, N-methylpyrrolidone), nitriles (acetonitrile), sulphones and sulphoxides (dimethyl sulphoxide, tetramethylene sulphone). Polar solvents are preferably employed.

If the prepolymer consists of components (a), (b), (c) and (d), the reactants are employed e.g. in quantities of

| | |
|---|---|
| 1 | OH equivalent of component (a), |
| 0.05–1 | OH equivalents of component (b), |
| 0.5–1.95 | NCO equivalents of component (c), and |
| 0.1–2 | NCO or acid halide equivalents of component (d). |

It is preferable to produce prepolymers by using

| | |
|---|---|
| 1 | OH equivalent of component (a), |
| 0.1–0.8 | OH equivalents of component (b), |
| 0.6–1.5 | NCO equivalents of component (c), and |
| 0.1–1.5 | NCO or acid halide equivalents of component (d). |

It is especially preferable to produce prepolymers by using

| | |
|---|---|
| 1 | OH equivalent of component (a), |
| 0.2–0.5 | OH equivalents of component (b), |
| 0.8–1.4 | NCO equivalents of component (c), and |
| 0.1–1 | NCO or acid halide equivalents of component (d). |

The stoichiometry is advantageously chosen so that the sum of OH equivalents of components (a) and (b) is greater than the number of NCO equivalents of component (c). It is further preferred for the sum of OH equivalents of components (a) and (b) to be equal to or greater than, preferably approximately equal to, the sum of NCO and acid halide equivalents of components (c) and (d).

Components (a)–(d) are all known compounds or compound mixtures, or may be obtained in accordance with methods known per se.

The reaction temperature is e.g. −5° C. to 150° C., preferably 0 to 100° C., most preferably 0 to 80° C., and particularly preferably 15 to 50° C. Furthermore, it is preferable for the reaction of the hydroxy-group-containing components (a) and (b) with the isocyanate-group-containing components (c) and (d) to be carried out in the presence of a catalyst. Suitable catalysts are for example metal salts such as alkali metal salts or tin salts of organic carboxylic acids, or tertiary amines, for example ($C_1$–$C_6$-alkyl)$_3$N (triethylamine, tri-n-butylamine), N-methylpyrrolidine, N-methylmorpholine, N,N-dimethylpiperidine, pyridine and 1,4-diaza-bicyclooctane. Tin salts have proved to be particularly effective, especially alkyl-tin salts of carboxylic acids, for example dibutyl tin dilaurate and tin dioctoate.

The catalyst is employed in the reaction e.g. in a molar ratio of 1:10 to 1:1000, preferably 1:50 to 1:750, most preferably ca. 1:100 to 1:500, respectively based on component (a).

The reaction times may vary within a broad range, whereby progress of the reaction can be followed well by monitoring the reduction of the isocyanate content in the reaction mixture. As a rule, reaction times of 1 to 24 hours, preferably 4 to 16 hours, are sufficient to achieve a complete reaction.

Isolation and purification of the produced compounds are effected by known processes, for example extraction, crystallisation, recrystallisation, ultrafiltration or by chromatographic purification methods. The compounds are obtained in high yields and high purity.

It is advantageous to react a mixture of the above-mentioned components (a) and (b) either with a mixture of components (c) and (d) or preferably first of all with component (c) and then with component (d).

One preferred embodiment of the present invention relates to a process for the production of prepolymers, which is characterised in that a mixture of components (a) and (b) is firstly allowed to react with component (c), and afterwards is reacted without intermediate isolation with component (d), as well as the prepolymers obtainable in this way.

A further preferred embodiment of the present invention relates to a process for the production of crosslinkable prepolymers, which is characterised in that a mixture of 1 OH equivalent of component (a) and 0.05 to 1 OH equivalents of component (b) is reacted in an inert solvent at a temperature of 0 to 100° C. in the presence of a catalyst either with a mixture of 0.5 to 1.95 NCO equivalents of a component (c) and 0.1 to 2 NCO or acid halide equivalents of a component (d) or first of all with 0.5 to 1.95 NCO equivalents of a component (c) and then with 0.1 to 2 NCO or acid halide equivalents of a component (d), wherein for components (a), (b), (c) and (d) the above-mentioned meanings and preferences apply, as well as the crosslinkable prepolymers obtainable by the process.

An especially preferred embodiment of the present invention relates to a process for the production of crosslinkable prepolymers, which is characterised in that a mixture of 1 OH equivalent of component (a) and 0.1 to 0.8 OH equivalents of component (b) is reacted, in an inert solvent at a temperature of 0 to 80° C., in the presence of a catalyst selected from the group of metal salts of organic carboxylic acids and tertiary amines, first of all with 0.6 to 1.5 NCO equivalents of component (c) and then with 0.1 to 1.5 NCO or acid halide equivalents of a component (d), wherein for components (a), (b), (c) and (d) the above-mentioned meanings and preferences apply, as well as the crosslinkable prepolymers obtainable by the process.

The prepolymers according to the invention are crosslinkable, but uncrosslinked or at least substantially uncrosslinked; nevertheless, they are stable, i.e. spontaneous crosslinking due to homopolymerisation does not take place.

The crosslinkable prepolymers which are obtainable by means of polymerisation of components (a)–(d), and optionally further copolymerisable monomers, are advantageously liquid or readily meltable or water-soluble; the prepolymers which are water-soluble are preferred in particular. The average molecular weight of the prepolymers according to the invention may vary within a broad range. An average molecular weight of e.g. 1000 to 50,000 has proved to be advantageous for the prepolymers according to the invention.

Furthermore, the prepolymers according to the invention may be purified in a manner known per se, for example by precipitation with acetone, dialysis or ultrafiltration, whereby ultrafiltration is preferred in particular. As a result of this purification procedure, the prepolymers according to the invention may be obtained in extremely pure form, e.g. as solvent-free liquids or melts or as concentrated aqueous solutions, which are free from or at least substantially free from reaction products such as salts, and from starting materials or other non-polymeric constituents.

The preferred purifiying process for the prepolymers according to the invention, ultrafiltration, may be carried out in a manner known per se. Thus, it is possible to carry out ultrafiltration repeatedly, for example two to ten times. Alternatively, ultrafiltration may also be carried out continuously, until reaching the desired degree of purity. The desired degree of purity may be basically selected at any level, and is preferably set so that the content of undesired constituents in the prepolymers is e.g. $\leq 0.001\%$, most preferably $\leq 0.0001\%$ (1 ppm). As a result of their synthesis, the prepolymers may additionally contain constituents which are acceptable from a physiological point of view, e.g. sodium chloride, whereby such constituents are advantageously present in an amount of $\leq 1\%$, preferably $\leq 0.1\%$, most preferably $\leq 0.01\%$.

As already mentioned above, the prepolymers according to the invention may be crosslinked in an extremely effective and well-directed manner, in particular by photo-crosslinking. Crosslinking may take place in the presence or preferably in the absence of an additional vinylic comonomer. The crosslinked polymers are insoluble in water.

In the case of photo-crosslinking, a photo-initiator is suitably added which can initiate radical crosslinking. Examples of these are familiar to the person skilled in the art, and suitable photo-initiators which may be mentioned in particular are benzoin-methylether, 1-hydroxycyclohexyl-phenylketone, Darocure® 1173 or Irgacure® types. Crosslinking may be commenced by actinic radiation, e.g. UV light, or by ionised radiation, e.g. gamma rays or X-rays.

Photopolymerisation may also be carried out without adding a solvent, e.g. if the prepolymer is a liquid or readily meltable prepolymer, or it takes place in a suitable solvent. Suitable solvents are basically all solvents that dissolve the polymers according to the invention and the optionally additionally employed vinylic comonomers, e.g. water, alcohols such as lower alkanols, e.g. ethanol or methanol, furthermore carboxylic acid amides, such as dimethylformamide, or dimethyl sulphoxide, and likewise mixtures of suitable solvents, e.g. mixtures of water with an alcohol, such as a water/ethanol or a water/methanol mixture.

Photo-crosslinking is preferably effected whilst solvent-free or essentially solvent-free or directly from an aqueous solution of the prepolymers according to the invention, which may be obtained as the result of the preferred purification step, ultrafiltration, optionally after adding an additional vinylic comonomers. For example, photo-crosslinking may be undertaken from a 15 to 90% aqueous solution.

The process for the production of the crosslinked polymers according to the invention can be characterised e.g. in that a prepolymer, which is a polymerisation product obtainable as described above from components (a), (b), (c) and (d) and optionally further copolymerisable monomers, especially in substantially pure form, i.e. for example after ultrafiltration once or several times, is photo-crosslinked whilst solvent-free or substantially solvent-free or in solution, especially in aqueous solution, in the presence or preferably in the absence of an additional vinylic comonomer, preferably using a photoinitiator.

The vinylic comonomer which may be additionally used for photo-crosslinking in accordance with the invention may be hydrophilic, hydrophobic or may be a mixture of a hydrophobic and a hydrophilic vinylic monomer. Suitable vinylic monomers include especially those normally used for the manufacture of contact lenses. By a hydrophilic vinylic monomer is understood a monomer which as a homopolymer typically yields a polymer that is water-soluble or can absorb at least 10 percent by weight water. In analogous manner, by a hydrophobic vinylic monomer is understood a monomer which as a homopolymer typically yields a polymer that is insoluble in water and can absorb less than 10 percent by weight water.

It is preferable to use a hydrophobic vinylic comonomer, or a mixture of a hydrophobic vinylic comonomer with a hydrophilic vinylic comonomer, whereby this mixture contains at least 50 percent by weight of a hydrophobic vinyl comonomer. In this way, the mechanical properties of the polymer may be improved without the water content dropping substantially. What basically applies is that both conventional hydrophobic vinylic comonomers and conventional hydrophilic vinylic comonomers are suitable for copolymerisation with the prepolymers according to the invention.

Suitable hydrophobic vinylic comonomers include, without this being a definitive list, $C_1$–$C_{18}$-alkylacrylates and -methacrylates, $C_3$–$C_{18}$ alkylacrylamides and -methacrylamides, acrylonitrile, methacrylonitrile, vinyl-$C_1$–$C_{18}$-alkanoates, $C_2$–$C_{18}$-alkenes, $C_2$–$C_{18}$-halo-alkenes, styrene, $C_1$–$C_6$-alkylstyrene, vinylalkylethers in which the alkyl moiety has 1 to 6 carbon atoms, $C_2$–$C_{10}$-perfluoroalkyl-acrylates and -methacrylates or correspondingly partially fluorinated acrylates and methacrylates, $C_3$–$C_{12}$-perfluoralkyl-ethyl-thiocarbonylaminoethyl-acrylates and -methacrylates, acryloxy and methacryloxy-alkylsiloxanes, N-vinylcarbazole, $C_1$–$C_{12}$-alkylesters of maleic acid, fumaric acid, itaconic acid, mesaconic acid and the like. Preference is given e.g. to $C_1$–$C_4$-alkylesters of vinylically unsaturated carboxylic acids with 3 to 5 carbon atoms or vinylesters of carboxylic acids with up to 5 carbon atoms.

Examples of suitable hydrophobic vinylic comonomers include methylacrylate, ethylacrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thiocarbonyl-aminoethyl-methacrylate, isobornyl methacrylate, trifluoroethyl methacrylate, hexafluoro-isopropyl methacrylate, hexafluorobutyl methacrylate, tris-trimethylsilyloxy-silyl-propyl methacrylate, 3-methacryloxypropyl-pentamethyl-disiloxane and bis(methacryloxypropyl)-tetramethyl-disiloxane.

Suitable hydrophilic vinylic comonomers include, without this being a definitive list, hydroxy-substituted lower alkylacrylates and -methacrylates, acrylamide, methacrylamide, lower alkyl-acrylamides and -methacrylamides, ethoxylated acrylates and methacrylates, hydroxy-substituted lower alkyl-acrylamides and -methacrylamides, hydroxy-substituted lower alkylvinyl-ethers, sodium ethylene sulphonate, sodium styrene sulphonate, 2-acrylamido-2-methyl-propane-sulphonic acid, N-vinyl pyrrole, N-vinyl succinimide, N-vinyl pyrrolidone, 2- or 4-vinyl pyridine, acrylic acid, methacrylic acid, amino-(whereby the term "amino" also includes quaternary ammonium), mono-lower-alkylamino- or di-lower-alkylamino-lower-alkyl-acrylates and -methacrylates, allyl alcohol and the like. Preference is given e.g. to hydroxy-substituted $C_2$–$C_4$-alkyl(meth)acrylates, five- to seven-membered N-vinyl-lactams, N,N-di-$C_1$–C4-alkyl-(meth) acrylamides and vinylically unsaturated carboxylic acids with a total of 3 to 5 carbon atoms.

Examples of suitable hydrophilic vinylic comonomers include hydroxyethyl methacrylate, hydroxyethyl acrylate, acrylamide, methacrylamide, dimethylacrylamide, allyl alcohol, vinyl pyridine, vinyl pyrrolidone, glycerol methacrylate, N-(1,1-dimethyl-3-oxobutyl)acrylamide, and the like.

Preferred hydrophobic vinylic comonomers are methyl methacrylate and vinyl acetate. Preferred hydrophilic vinylic comonomers are 2-hydroxyethyl methacrylate, N-vinyl pyrrolidone and acrylamide.

The processing according to the invention of the prepolymers into moulded ophthalmic articles, especially contact lenses, may take place in a manner known per se, for example whereby photo-crosslinking of the prepolymers according to the invention takes place in an appropriate contact lens mould. Further examples of moulded articles according to the invention, apart from contact lenses, are e.g. intra-occular lenses or eye dressings, furthermore biomedicinal articles which may be used in surgery, such as heart valves, artificial arteries or the like, also films or membranes, e.g. membranes for diffusion control, photo-structurable films for data storage, or photo resist materials, e.g. membranes or moulded articles for etch resist printing or screen resist printing.

One preferred process for the production of an ophthalmic moulding is characterised in that it comprises the following steps:

a) introducing a prepolymer, which is obtainable as depicted above from components (a), (b), (c) and (d) and is liquid or readily meltable at room temperature, and which is essentially free from solvents, into a mould, in the presence or preferably in the absence of an additional vinylic comonomer, and supplementing with a photo-initiator, b) initiating the photo-crosslinking, c) opening the mould, so that the moulding can be removed from the mould.

A further preferred process for the production of an ophthalmic moulding is characterised in that it comprises the following steps:

a) producing a water-soluble prepolymer, which is obtainable as depicted above from components (a), (b), (c) and (d), in an essentially aqueous solution, in the presence or preferably in the absence of an additional vinylic comonomer, and supplementing with a photo-initiator, b) introducing the solution obtained into a mould, c) initiating the photo-crosslinking, d) opening the mould, so that the moulding can be removed from the mould.

The prepolymers according to the invention may be introduced into a mould by methods known per se, especially conventional dispensing, e.g. dropwise addition. If vinylic comonomers are present, the comonomers employed are those mentioned above, in the quantities depicted above. Any vinylic comonomers that are optionally present are advantageously first of all mixed with the prepolymer according to the invention and then introduced into the mould.

Appropriate moulds are made for example from polypropylene. Suitable materials for re-usable mounds are e.g. quartz, sapphire glass or metals.

If the moulded articles to be produced are contact lenses, these may be produced in a manner known per se, e.g. in a conventional "spin-casting mould", as described for example in U.S. Pat. No. 3,408,429, or by the so-called full mould process in a static form, as described e.g. in U.S. Pat. No. 4,347,1 98.

Photo-crosslinking may be initiated in the mould e.g. by means of actinic radiation, such as UV light, or ionising radiation, such as gamma radiation or X-rays.

As already mentioned, photo-crosslinking is advantageously carried out in the presence of a photo-initiator which can initiate radical crosslinking. The photo-initiator is advantageously added to the prepolymers according to the invention prior to introducing them into the mould, preferably by mixing the polymers and the photo-intiator together. The amount of photo-initiator may be selected from a wide range, whereby an amount of up to 0.05 g/g polymer and especially up to 0.003 g/g polymer has proved favourable.

What is notable is that the crosslinking according to the invention may be effected in a very short time, e.g. in $\leq 60$ minutes, advantageously in $\leq 20$ minutes, preferably in $\leq 10$ minutes, most preferably in $\leq 5$ minutes, particularly preferably in 1 to 60 seconds and most particularly in 1 to 30 seconds.

Opening of the mould so that the moulded article can be removed from the mound may take place in a manner known per se.

If the moulded article produced according to the invention is a contact lens which was produced solvent-free from an already purified prepolymer according to the invention, then after removal of the moulded article, it is not normally necessary to follow up with purification steps such as extraction. This is because the prepolymers employed do not contain any undesired constituents of low molecular weight; consequently, the crosslinked product is also free or substantially free from such constituents and subsequent extraction can be dispensed with. Accordingly, the contact lens can be directly transformed in the usual way, by hydration, into a ready-to-use contact lens. Appropriate embodiments of hydration are known to the person skilled in the art, whereby ready-to-use contact lenses with very varied water content may be obtained. The contact lens is expanded for example in water, in an aqueous salt solution, especially an aqueous salt solution having an osmolarity of about 200 to 450 milli-osmole in 1000 ml (unit: mOsm/ml), preferably about 250 to 350 mOsm/l and especially about 300 mOsm/l, or in a mixture of water or an aqueous salt solution with a physiologically compatible polar organic solvent, e.g. glycerol. Preference is given to expansions of the prepolymer in water or in aqueous salt solutions.

The aqueous salt solutions used for hydration are advantageously solutions of physiologically compatible salts, such as buffer salts conventionally used in the field of contact lens care, e.g. phosphate salts, or isotonising agents conventionally used in the field of contact lens care, such as in particular alkali halides, e.g. sodium chloride, or solutions of mixtures thereof. One example of an especially suitable salt solution is an artificial, preferably buffered lachrymal fluid, which is adapted to natural lachrymal fluid as regards pH value and osmolarity, e.g. an unbuffered or preferably buffered common salt solution, for example buffered by phosphate buffer, whose osmolarity and pH value correspond to the osmolarity and pH value of human lachrymal fluid.

The above-defined hydration fluids are preferably pure, i.e. free or substantially free from undesired constituents. This is most preferably pure water or an artificial lachrymal fluid as described above.

If the moulded article produced according to the invention is a contact lens which was produced from an aqueous solution of an already purified prepolymer according to the invention, then the crosslinked product also does not contain any troublesome impurities. It is therefore not necessary to carry out subsequent extraction. Since crosslinking is carried out in an essentially aqueous solution, it is additionally unnecessary to carry out subsequent hydration. The contact lenses obtainable by this process are therefore notable, according to an advantageous embodiment, for the fact that they are suitable for their intended usage without extraction.

By intended usage is understood, in this context, that the contact lenses can be used in the human eye.

The contact lenses obtainable according to the invention have a wide range of unusual and extremely advantageous properties. One of these properties which may be named is for example its excellent compatability with the human cornea, which is based on a well-balanced relationship between water content, oxygen permeability and mechanical properties. Moreover, the contact lenses according to the invention have high resistance of shape. No changes in shape can be detected even after autoclaving at e.g. about 120° C.

What is also notable is that the contact lenses according to the invention, i.e. especially those containing a crosslinked polymer consisting of a prepolymer that is a polymerisation product of the above-mentioned components (a), (b), (c) and (d), can be produced in a very simple and efficient way compared with the prior art. This is based on many factors. On the one hand, the starting materials may be acquired or produced inexpensively. Secondly, there is the advantage that the prepolymers are surprisingly stable, so that they may undergo a high degree of purification. Therefore, for crosslinking, a polymer may be used which requires practically no more subsequent purification, such as in particular complicated extraction of unpolymerised constituents. Furthermore, crosslinking may take place solvent-free or in aqueous solution, so that a subsequent solvent exchange or the hydration step is not necessary. Finally, photo-polymerisation is effected within a short period, so that from this point of view also the production process for the contact lenses according to the invention may be set up in an extremely economic way.

Of course, all the above-mentioned advantages apply not only to contact lenses, but also to other moulded articles according to the invention. The total of the different advantageous aspects during production of the moulded articles according to the invention leads to the suitability of the moulded articles in particular as mass-produced articles, for example as contact lenses which are worn for a short time-span and then replaced by new lenses.

In the following examples, if not expressly stated otherwise, the quantities given are amounts by weight, and the temperatures are given in degrees Celsius. The examples are not suitable for limiting the invention in any way, for example to the scope of the examples.

PREPARATION EXAMPLES

Example 1

30 g of polyethylene glycol 600 and 0.67 g of 1,1,1-trimethylol propane are dissolved in 300 ml of ethyl methyl ketone and heated to ca. 45° C. 0.07 g of dibutyl tin dilaurate are added, then 8.35 g of isophorone diisocyanate added dropwise, and stirred for ca. 4 hours at 45° C. Then, 6.2 g of isocyanato ethyl methacrylate (IEM) are added and stirring continued until the isocyanate content has lowered to 0.04 equivalents/kg. The solution is concentrated and the product precipitated from diethylether as a slightly yellowish oil.

Example 1a 30 g of polyethylene glycol 600 and 0.67 g of 1,1,1-trimethylol propane are dissolved in 300 ml of tetrahydrofuran and heated to ca. 45° C. 0.07 g of dibutyl tin dilaurate are added, then 8.35 g of isophorone diisocyanate are added dropwise, and stirring effected for ca. 4 hours at 45° C. Then, 4.18 g of methacrylol chloride and 2.8 g of triethylamine are added and stirring continued until practically no acid chloride can be detected. The solution is concentrated and the product precipitated from diethylether as a slightly yellowish oil.

Example 2

20 g of polyethylene glycol 1000 and 0.54 g of 1,1,1-trimethylol propane are dissolved in 250 ml of ethyl methyl ketone and heated to ca. 45° C. 0.05 g of dilbutyl tin dilaurate are added, then 4.45 g of isophorone diisocycnate are added dropwise, and stirring effected for ca. 2 hours at 45° C. Then, 1.86 g of isocyanato ethyl methacrylate (IEM) are added dropwise, and stirring continued for ca. 10 hours at 45° C. At the end, the solution is concentrated and the product precipitated from diethylether as a clear oil which begins to crystallise after some time.

Example 3

6 g of polyethylene glycol 600, 10 g of polyethylene glycol 1000 and 0.54 g of 1,1,1-trimethylol propane are reacted with 4.45 g of isophorone diisocyanate and 1.86 g of isocyanato ethyl methacrylate (IEM) by the method described in example 2. After precipitation from diethylether, a clear, viscous oil is obtained.

Example 4

12 g of polyethylene glycol 600 and 0.37 g of glycerol are reacted with 3.36 g of hexamethylene diisocyanate and 1.86 g of isocyanato ethyl methacrylate (IEM) by the method described in example 2. After precipitation from diethylether, a clear, viscous oil is obtained.

Application Examples

Example 5

1.4 g of the polymer obtained according to example 1 and 4 mg of Irgacure® 2959 are mixed with 0.6 g of water until a clear homogeneous solution is obtained. From the clear, viscous solution, a 0.1 mm thick film is produced between two glass plates with spacers. The film is exposed to a UV lamp for 10 seconds. A clear, flexible film is obtained, which swells in water to form a clear hydrogel with a solid content of 42%. The elasticity module of the swollen film is 1 MPa (measured with a tensometer from the company Vitrodyne), and the tensile expansion has a value of 130%.

By employing the above process with an equivalent amount of the polymer produced according to example 1a, instead of the polymer obtained according to example 1, a film with equally good properties is obtained.

Example 6

1.4 g of the polymer obtained according to example 2 and 4 mg of Irgacure® 2959 are mixed with 0.6 g of water until a clear homogeneous solution is obtained. From the clear, viscous solution, a 0.1 mm thick film is produced between two glass plates with spacers. The film is exposed to a UV lamp for 10 seconds. A clear, flexible film is obtained, which swells in water to form a clear hydrogel with a dry content of 31%. The elasticity module of the swollen film is 0.8 MPa (measured with a tensometer from the company Vitrodyne), and the tensile expansion has a value of 140%.

Example 7

From the product according to example 3, a 70% aqueous solution with 0.2% by weight Irgacure® 2959 is produced by the method described in example 1. The film obtained through irradiation for 10 seconds swells in water to form a hydrogel with 30% dry content. The elasticity module of the film is 0.7 MPa, and the tensile expansion is ca. 120%.

Example 8

1.0 g of the polymer obtained according to example 4 and 4 mg of Irgacure® 2959 are mixed with 1.0 g of water until a clear homogeneous solution is obtained. From the clear, viscous solution, a 0.1 mm thick film is produced between two glass plates with spacers. The film is exposed to a UV lamp for 10 seconds. A clear, flexible film is obtained, which swells in water to form a clear hydrogel with a dry content of 26%. The elasticity module of the swollen film is 0.48 MPa (measured with a tensometer from the company Vitrodyne), and the tensile expansion has a value of ca. 110%.

What is claimed is:

1. Ophthalmic moulding, which is obtained by crosslinking a prepolymer which is the copolymerisation product of (a) at least one polyalkylene glycol of formula $$HO-(CH_2-CH_2-O)_n-(CHY_1-CHY_2-O)_m-(CHY_3-CHY_4-O)_p-H \qquad (1)$$

or $$HO-[(CH_2-CH_2-CH_2-CH_2-O)]_q-H \qquad (1'),$$

wherein one of radicals $Y_1$ and Y2 is methyl and the other is hydrogen, one of radicals $Y_3$ and $Y_4$ is ethyl and the other is hydrogen, q is a number from 1 to 50, and n, m and p, independently of one another, are each a number from 0 to 100, wherein the sum of (n+m+p) is 5 to 100, (b) at least one polyhydroxy compound selected from the group consisting of (i) a linear or branched aliphatic polyhydroxy compound of formula $$R_1-(OH)_x \qquad (2),$$

wherein $R_1$ is the radical of a multi-functional linear or branched aliphatic alcohol and x is a number $\geq 3$, (ii) a polyether polyol, which is the polymerisation product of a compound of formula (2) and a glycol, (iii) a polyester polyol, which is the polymerisation product of a compound of formula (2), a dicarboxylic acid or a derivative thereof and a diol, and (iv) a cycloaliphatic polyol selected from the group consisting of a $C_5$–C8-cyclo-alkane, which is substituted by $\geq 3$ hydroxy groups, and an unsubstituted mono- and disaccharide, (c) at least one di- or polyisocyanate of formula $$R_2-(NCO)_y \qquad (3)$$

wherein $R_2$ is the radical of an aliphatic, cycloaliphatic, aliphatic-cycloaliphatic, aromatic or araliphatic di- or polyisocyanate and y is a number from 2 to 6, (d) at least one ethylenically unsaturated monoisocyanate of formula

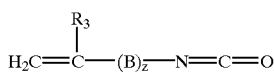 (4)

or an ethylenically unsaturated acid halide of formula

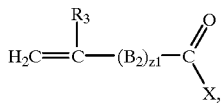 (4')

wherein $R_3$ is hydrogen or methyl, z and z1, independently of one another, each signify the number 0 or 1, B signifies $C_1$–$C_6$-alkylene, or phenylene or $C_7$–$C_{12}$-aralkylene which is each unsubstituted or substituted by $C_1$–$C_4$-alkyl or $C_1$–$C_4$-alkoxy, or a radical of formula

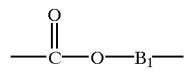 (5)

$B_1$ signifies linear or branched $C_2$–$C_{12}$-alkylene which is optionally interrupted by one or more oxygen atoms, $B_2$ is $C_1$–$C_6$-alkylene and X signifies halogen, and optionally one or more further copolymerisable monomers, in the absence or presence of an additional vinylic comonomer.

2. Ophthalmic moulding according to claim 1, which is a contact lens.

3. Ophthalmic moulding according to claim 1, characterised in that it is obtained by crosslinking a prepolymer, which is the copolymerisation product of the components (a), (b), (c) and (d) given in claim 1, in the absence or presence of an additional vinylic comonomer.

4. Ophthalmic moulding according to claim 1, wherein $R_2$ is linear or branched $C_6$–$C_{10}$-alkylene, cyclohexylene-methylene or cyclohexylene-methylene-cyclohexylene which are either unsubstituted or substituted in the cyclohexyl moiety by 1 to 3 methyl groups, or phenylene or phenylene-methylene-phenylene which are either unsubstituted or substituted in the phenyl moiety by methyl.

5. Ophthalmic moulding according to claim 1, obtained by crosslinking a prepolymer, which is the copolymerisation product of (a) one or more polyalkylene glycols of formula

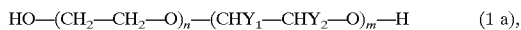 (1 a), wherein one of radicals $Y_1$ and $Y_2$ signifies methyl and the other radical signifies hydrogen,
and n and m, independently of one another, each denote a number from 0 to 50,
wherein the sum of (n+m) is 8 to 50, (b) (i) one or more polyhydroxy compounds of formula $R_1$—(OH)$_x$ (2)

wherein $R_1$ is the radical of a multi-functional aliphatic alcohol and x is a number from 3 to 8, (c) one or more diisocyanates of formula

 (3a), wherein $R_2$ signifies linear or branched $C_3$–$C_8$-alkylene or unsubstituted or $C_1$–$C_4$-alkyl-substituted or $C_1$–$C_4$-alkoxy-substituted $C_6$–$C_{10}$-arylene, $C_7$–$C_{18}$-aralkylene, $C_6$–$C_{10}$-arylene-$C_1$–$C_2$-alkylene-$C_6$–$C_{10}$-arylene, $C_3$–$C_8$-cycloalkylene, $C_3$–$C_8$-cycloalkylene-$C_1$–$C_6$-alkylene, $C_3$–$C_8$-cycloalkylene-$C_1$–$C_2$-alkylene-$C_3$–$C_8$-cycloalkylene or $C_1$–$C_6$-alkylene-$C_3$–$C_8$-cycloalkylene-$C_1$–$C_6$-alkylene, and (d) one or more ethylenically unsaturated compounds of formula

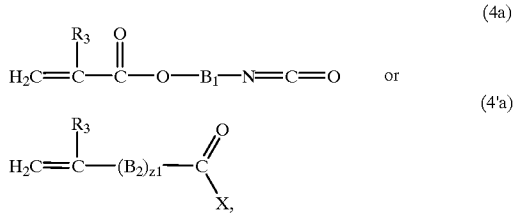

wherein $R_3$ is hydrogen or methyl, $B_1$ signifies linear or branched $C_2$–$C_8$-alkylene, $B_2$ is $C_1$–$C_4$-alkylene, z1 signifies the number 0 or 1 and X represents halogen, in the absence or presence of an additional vinylic comonomer in a mould.

6. Ophthalmic moulding according to claim 1, obtained by crosslinking a prepolymer, which is the copolymerisation product of (a) one or more polyalkylene glycols of formula

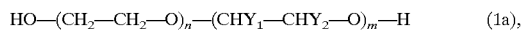 (1a), wherein one of radicals $Y_1$ and $Y_2$ signifies methyl and the other radical signifies hydrogen,
and n and m, independently of one another, each denote a number from 0 to 25,
wherein the sum of (n+m) is 9 to 25, (b) one or more polyhydroxy compounds selected from the group consisiting of glycerol, diglycerol, triglycerol, 1,1,1-trishydroxymethylethane, 1,1,1-trishydroxymethylpropane, 1,2,4-butanetriol, 1,2,6-hexanetriol, erythritol, pentaerythritol, di- or tripentaerythritol, arabitol, sorbitol, disorbitol and mannitol and mixtures thereof, (c) a diisocyanate of formula

 (3a), wherein R2 signifies linear or branched $C_6$–$C_{10}$-alkylene, cyclohexylene-methylene or cyclohexylene-methylene-cyclohexylene either unsubstituted or substituted in the cyclohexyl moiety by 1 to 3 methyl groups, or phenylene or phenylene-methylene-phenylene either unsubstituted or substituted in the phenyl moiety by methyl, and (d) an ethylenically unsaturated monoisocyanate of formula

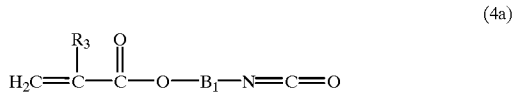 (4a)

wherein $R_3$ denotes hydrogen or methyl and $B_1$ signifies linear $C_2$–$C_4$-alkylene, in the absence or presence of an additional vinylic comonomer in a mould.

7. Prepolymer which is the copolymerisation product of components (a), (b), (c) and (d) given in claim 1.

8. Prepolymer according to claim 7, which is the copolymerisation product of (a) one or more polyalkylene glycols of formula

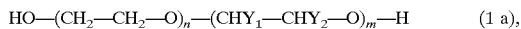

$$HO-(CH_2-CH_2-O)_n-(CHY_1-CHY_2-O)_m-H \quad (1a),$$

wherein one of radicals $Y_1$ and $Y_2$ signifies methyl and the other radical signifies hydrogen, and n and m, independently of one another, each denote a number from 0 to 50, wherein the sum of (n+m) is 8 to 50, (b) (i) one or more polyhydroxy compounds of formula $$R_1-(OH)_x \quad (2)$$

wherein $R_1$ is the radical of a multi-functional aliphatic or cycloaliphatic alcohol and x is a number from 3 to 8, (c) one or more diisocyanates of formula

$$OCN-R_2-NCO \quad (3a),$$

wherein $R_2$ signifies linear or branched $C_3$–$C_{18}$-alkylene or unsubstituted or $C_1$–$C_4$-alkyl-substituted or $C_1$–$C_4$-alkoxy-substituted $C_6$–$C_{10}$-arylene, $C_7$–$C_{18}$-aralkylene, $C_6$–$C_{10}$-arylene-$C_1$–$C_2$-alkylene-$C_6$–$C_{10}$-arylene, $C_3$–$C_8$-cycloalkylene, $C_3$–$C_8$-cycloalkylene-$C_1$–$C_6$-alkylene, $C_3$–C8-cycloalkylene-$C_1$–$C_2$-alkylene-$C_3$–$C_8$-cycloalkylene or $C_1$–$C_6$-alkylene-$C_3$–C8-cycloalkylene-$C_1$–$C_6$-alkylene, and (d) one or more ethylenically unsaturated compounds of formula

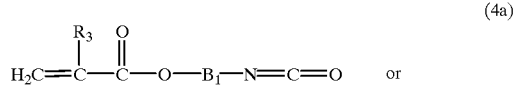

(4a)

or

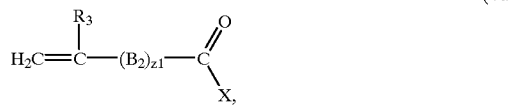

(4'a)

wherein $R_3$ is hydrogen or methyl, $B_1$ signifies linear or branched $C_2$–$C_8$-alkylene, $B_2$ is $C_1$–$C_4$- alkylene, z1 signifies the number 0 or 1 and X represents halogen.

9. Prepolymer according to claim 7, which is the copolymerisation product of (a) one or more polyalkylene glycols of formula

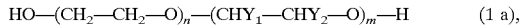

$$HO-(CH_2-CH_2-O)_n-(CHY_1-CHY_2-O)_m-H \quad (1a),$$

wherein one of radicals $Y_1$ and $Y_2$ signifies methyl and the other radical signifies hydrogen, and n and m, independently of one another, each denote a number from 0 to 25, wherein the sum of (n+m) is 9 to 25, (b) one or more polyhydroxy compounds selected from the group glycerol, diglycerol, triglycerol, 1,1,1-trishydroxymethylethane, 1,1,1-trishydroxymethylpropane, 1,2,4-butanetriol, 1,2,6-hexanetriol, erythritol, pentaerythritol, di- or tripentaerythritol, arabitol, sorbitol, disorbitol and mannitol or mixtures thereof, (c) a diisocyanate of formula

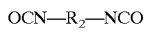

$$OCN-R_2-NCO \quad (3a),$$

wherein $R_2$ signifies linear or branched $C_6$–$C_{10}$-alkylene, cyclohexylene-methylene or cyclohexylene-methylene-cyclohexylene either unsubstituted or substituted in the cyclohexyl moiety by 1 to 3 methyl groups, or phenylene or phenylene-methylene-phenylene either unsubstituted or substituted in the phenyl moiety by methyl, and (d) an ethylenically unsaturated monoisocyanate of formula

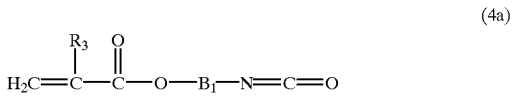

(4a)

wherein $R_3$ denotes hydrogen or methyl and $B_1$ signifies linear or branched $C_2$–$C_4$-alkylene.

10. Process for the production of a prepolymer according to claim 7, wherein components (a), (b), (c) and (d) given in claim 1 are reacted together, in any sequence, in an inert solvent at a temperature of –5° C. to 150° C.

11. Process according to claim 10, wherein a mixture of components (a) and (b) is either reacted with a mixture of components (c) and (d) or firstly with component (c) and then with component (d).

12. Process according to claim 10, wherein a mixture of 1 OH equivalent of component (a) and 0.05 to 1 OH equivalents of component (b) is reacted in an inert solvent at a temperature of 0 to 100° C. in the presence of a catalyst either with a mixture of 0.5 to 1.95 NCO equivalents of a component (c) and 0.1 to 2 NCO or acid halide equivalents of a component (d) or first of all with 0.5 to 1.95 NCO equivalents of a component (c) and then with 0.1 to 2 NCO or acid halide equivalents of a component (d).

13. Process according to claim 10, wherein a mixture of 1 OH equivalent of component (a) and 0.1 to 0.8 OH equivalents of component (b) is reacted, in an inert solvent at a temperature of 0 to 80° C., in the presence of a catalyst selected from the group of metal salts of organic carboxylic acids and tertiary amine, first of all with 0.6 to 1.5 NCO equivalents of component (c) and then with 0.1 to 1.5 NCO or acid halide equivalents of a component (d).

14. Process for the production of a moulding, wherein it comprises the following steps:

a) introducing a prepolymer, which is obtained according to one of claims 7 to 13 and is liquid or readily meltable at room temperature, and which is essentially free from solvents, into a mould, in the absence or presence of an additional vinylic comonomer, and supplementing with a photo-initiator, b) initiating the photo-crosslinking by exposure to actinic radiation, c) opening the mould, so that the moulded article can be removed from the mould.

15. Process according to claim 14, wherein the process is carried out in the absence of an additional vinylic comonomer.

16. Process for the production of a moulding, wherein it comprises the following steps:

a) producing a water-soluble prepolymer, which is obtained according to one of claims 7 to 13, in an essentially aqueous solution, in the absence or presence of an additional vinylic comonomer, and supplementing with a photo-initiator, b) introducing the solution obtained into a mould, c) initiating the photo-crosslinking by exposure to actinic radiation, d) opening the mould, so that the moulded article can be removed from the mould.

17. Process according to claim 16, whrein the process is carried out in the absence of an additional vinylic comonomer.

* * * * *